(12) United States Patent
Lin et al.

(10) Patent No.: US 12,456,238 B2
(45) Date of Patent: Oct. 28, 2025

(54) IMAGE GENERATION DEVICE AND IMAGE GENERATION METHOD (71) Applicant: ASUSTEK COMPUTER INC., Taipei (TW)

(72) Inventors: Hao-Ping Lin, Taipei (TW); Wen-Yun Liu, Taipei (TW); Chien-Chih Tseng, Taipei (TW); Hung-Yi Lin, Taipei (TW); Ya-Ting Chen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 18/951,514

(22) Filed: Nov. 18, 2024

(65) Prior Publication Data
US 2025/0308101 A1   Oct. 2, 2025

(30) Foreign Application Priority Data

Mar. 28, 2024 (TW) .................................. 113111825

(51) Int. Cl.
G06T 11/20 (2006.01)
G06F 3/041 (2006.01)
G06F 3/04883 (2022.01)
G06F 40/40 (2020.01)

(52) U.S. Cl.
CPC ............ *G06T 11/20* (2013.01); *G06F 3/0416* (2013.01); *G06F 3/04883* (2013.01); *G06F 40/40* (2020.01)

(58) Field of Classification Search
CPC ........ G06T 11/20; G06F 40/40; G06F 3/0416; G06F 3/04883
See application file for complete search history.

(56) References Cited

U.S. PATENT DOCUMENTS

2025/0131626 A1* 4/2025 Mun ...................... G06T 11/20

FOREIGN PATENT DOCUMENTS

| CN | 102915202 A | 2/2013 |
|----|-------------|--------|
| CN | 104281308 A | 1/2015 |

* cited by examiner

Primary Examiner — Yaron Cohen
(74) Attorney, Agent, or Firm — Muncy, Geissler, Olds & Lowe, P.C.

(57) ABSTRACT

An image generation device including a touch module with a function area and a touch area, a control unit and a processing unit is provided. The control unit is electrically coupled to the touch module and is configured to receive a first gesture signal through the function area and receive at least one trajectory signal through the touch area. The processing unit is electrically coupled to the control unit and stores a plurality of style prompt words. The processing unit selects one of the style prompt words based on the first gesture signal, generates an input image based on the trajectory signal, uses the input image as an input for a generative artificial intelligence model to generate an image prompt word set, and uses the style prompt word, the image prompt word set and the input image as inputs for the generative artificial intelligence model to generate an output image.

11 Claims, 10 Drawing Sheets

IMAGE GENERATION DEVICE AND IMAGE GENERATION METHOD

CROSS-REFERENCE TO RELATED APPLICATION

This application claims the priority benefit of Taiwan application serial No. 113111825, filed on Mar. 28, 2024. The entirety of the above-mentioned patent application is hereby incorporated by reference herein and made a part of the specification.

BACKGROUND OF THE INVENTION

Field of the Invention

The disclosure relates to the field of image generation technologies, and in particular, to an image generation device and an image generation method for generating an image in combination with a generative artificial intelligence model.

Description of the Related Art

Currently, in an image generation operation procedure, at least four operation steps (step one: open a drawing program; step two: complete drawing of a graphics; step three: archive the graphics; and step four: transfer the graphics to an image generation software program) are needed to generate an image. The entire procedure is too cumbersome, affecting operation efficiency of a user.

BRIEF SUMMARY OF THE INVENTION

The disclosure provides an image generation device, and the image generation device is configured to operate in combination with a generative artificial intelligence model. The image generation device includes a touch module, a control unit and a processing unit. The touch module includes a touch surface, where the touch surface includes a function area and a touch area. The control unit is electrically coupled to the touch module and is configured to: receive a first gesture signal through the function area, and receive at least one trajectory signal through the touch area. The processing unit is electrically coupled to the control unit and stores a plurality of style prompt words. The processing unit is configured to: select one of the style prompt words based on the first gesture signal; generate an input image based on the at least one trajectory signal; use the input image as an input for the generative artificial intelligence model to generate an image prompt word set; and use the style prompt word, the image prompt word set and the input image as inputs for the generative artificial intelligence model to generate an output image.

The disclosure further provides an image generation method, and the image generation method is applicable to an image generation device. The image generation device includes a touch module and stores a plurality of style prompt words. The image generation device is configured to operate in combination with a generative artificial intelligence model. The touch module includes a touch surface. The image generation method in the disclosure includes: forming a function area and a touch area on the touch surface; receiving a first gesture signal through the function area and selecting one of the style prompt words based on the first gesture signal; receiving at least one trajectory signal through the touch area and generating an input image based on the at least one trajectory signal; using the input image as an input for the generative artificial intelligence model to generate an image prompt word set; and using the style prompt word, the image prompt word set and the input image as inputs for the generative artificial intelligence model to generate an output image.

Based on the image generation device and the image generation method provided in the disclosure, a user only needs to input the first gesture signal and the at least one trajectory signal in a touch manner to complete an image generation operation step. This helps simplify an operation procedure, and integrates the entire operation procedure into the touch module, to improve operation efficiency of the user.

DETAILED DESCRIPTION OF THE EMBODIMENTS

The following describes specific embodiments of the disclosure in detail with reference to the accompanying drawings. According to the following descriptions and the claims, advantages and features of the disclosure become clearer. It should be noted that, the drawings, which are in simplified forms and are to imprecise scale, are merely used for facilitating clear descriptions of embodiments of the disclosure.

Figure 1:
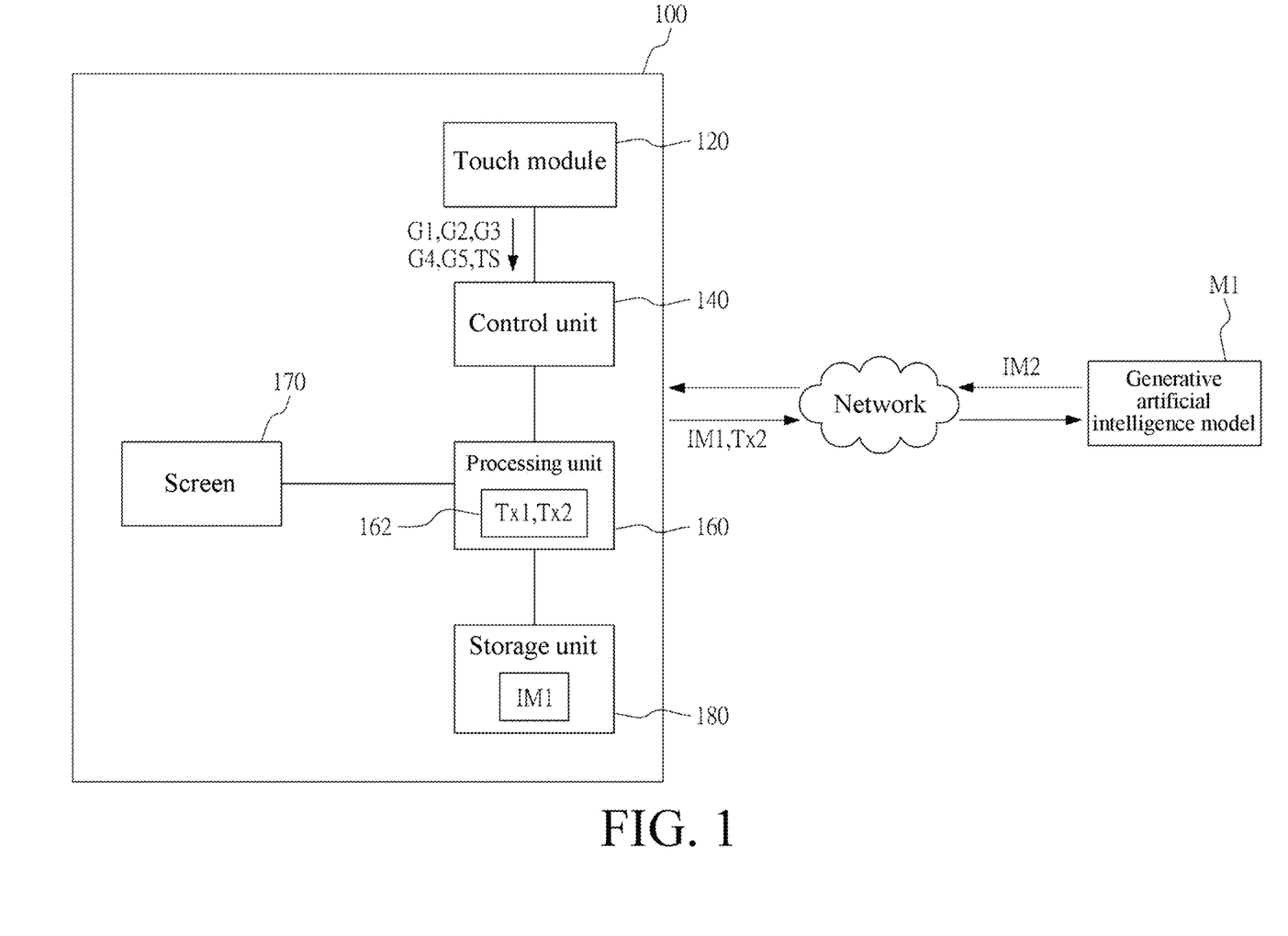
FIG. 1 is a block diagram of an image generation device according to an embodiment of the disclosure.

FIG. 1 is a block diagram of an image generation device according to an embodiment of the disclosure.

The image generation device 100 is configured to operate in combination with a generative artificial intelligence model M1. The image generation device 100 in this embodiment is an electronic device with a touch function and a computing function, such as a desktop computer, a notebook computer, a tablet computer, or a smartphone. Any generative artificial intelligence model M1 with an image-to-text generation function and an image-to-image generation function, such as GPT-3 or GPT-4 developed by OpenAI, is applicable to the disclosure.

In an embodiment, the generative artificial intelligence model M1 is disposed in a cloud server, and the image generation device 100 is connected to the cloud server via a network for operation. In another embodiment, the generative artificial intelligence model M1 is disposed in an edge device, and the image generation device 100 is connected to the edge device for operation. In still another embodiment, the generative artificial intelligence model M1 is disposed in the image generation device 100 in the disclosure, and operates in combination with the image generation device 100.

The image generation device 100 includes a touch module 120, a control unit 140, a processing unit 160, a screen 170, and a storage unit 180.

Figure 2:
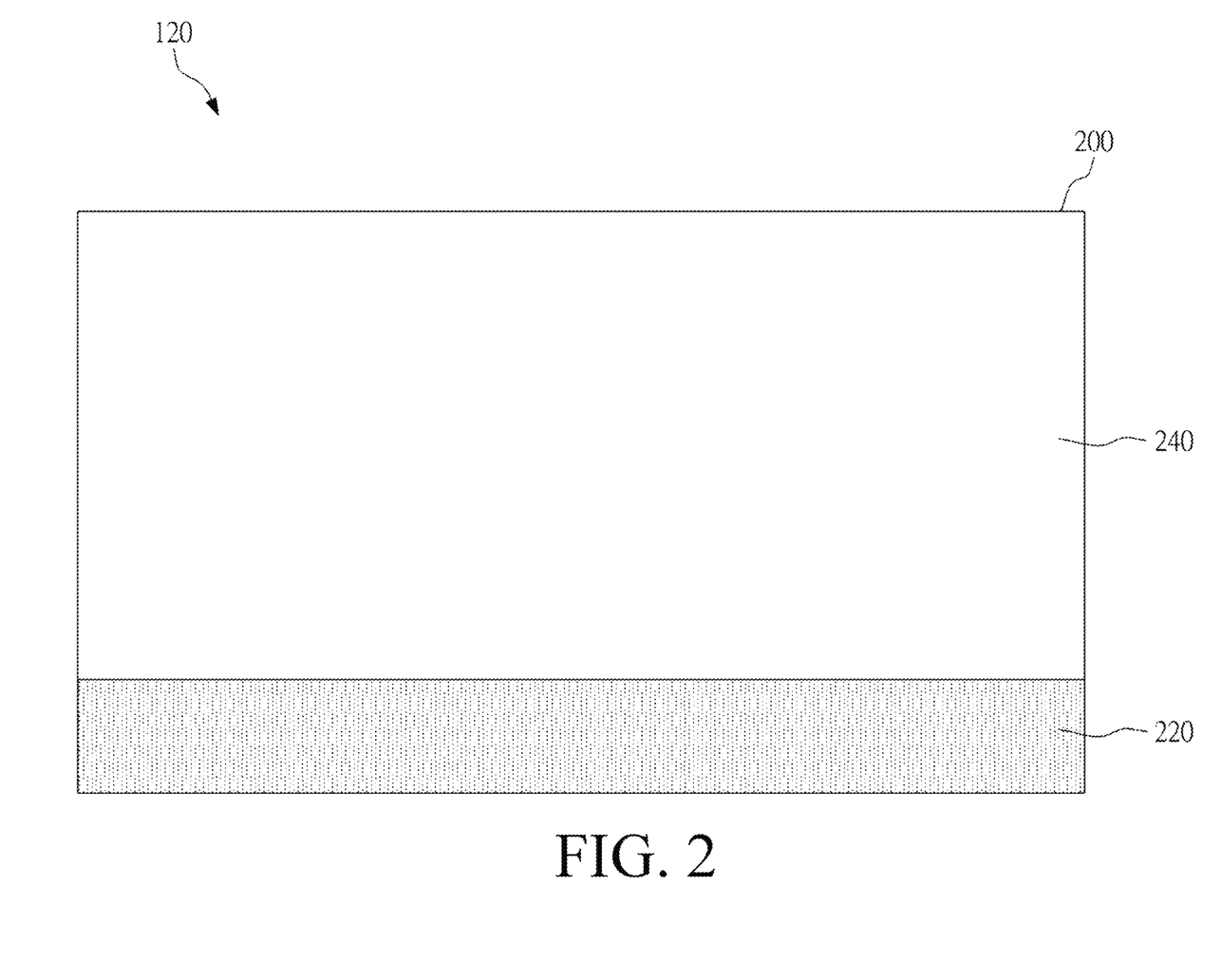
FIG. 2 is a diagram of areas into which a touch surface of a touch module is divided according to an embodiment of the disclosure.

Further refer to FIG. 2. FIG. 2 is a diagram of areas into which a touch surface of a touch module is divided according to an embodiment of the disclosure. As shown in the figure, the touch module 120 includes a touch surface 200. The touch surface 200 includes a function area 220 and a touch area 240. In an embodiment, the function area 220 is located at an edge of the touch surface 200, and an area outside the function area 220 is the touch area 240. As shown the figure, the function area 220 in this embodiment is located at a lower edge of the touch surface 220, and is an elongated area. In other embodiments, the function area 220 is located at an upper edge, at a left edge, at a right edge, or at a corner of the touch surface 220.

In an embodiment, the function area 220 and the touch area 240 on the touch surface 200 are defined on the touch surface 200 by software or firmware, and are not separated in the form of hardware. In an embodiment, the touch module 120 is a touch pad. In another embodiment, the touch module 120 is a touch screen with a screen display function.

The control unit 140 is electrically coupled to the touch module 120 and is configured to receive a first gesture signal G1, a second gesture signal G2, a third gesture signal G3, a fourth gesture signal G4 and a fifth gesture signal through the function area 220. The control unit 140 is further configured to receive at least one trajectory signal TS through the touch area 240. In an embodiment, the control unit 140 is an embedded controller or a microprocessor.

The processing unit 160 is electrically coupled to the control unit 140 and stores a plurality of style prompt words Tx1 and Tx2 for a user to select a style of an image to be generated. In an embodiment, the style prompt words Tx1 and Tx2 are nature-related words, art-related words, life-related words, and the like. In an embodiment, the processing unit 160 is a central processing unit. In an embodiment, the style prompt words Tx1 and Tx2 are stored in a memory 162.

The processing unit 160 selects one of the style prompt words Tx1 and Tx2 (for example, select the style prompt word Tx1) based on the first gesture signal G1 received by the control unit 140, and generate an input image IM1 based on the trajectory signal TS received by the control unit 140. After selecting the style prompt word Tx1 and generating the input image IM1, the processing unit 160 operates in combination with the generative artificial intelligence model M1 to generate an output image IM2. The processing unit 160 is electrically coupled to the screen 170 to present the input image IM1 and the output image IM2 on the screen 170 for the user to confirm.

In addition to the first gesture signal G1, the processing unit 160 performs corresponding operations based on the second gesture signal G2, the third gesture signal G3, the fourth gesture signal G4, and the fifth gesture signal G5. The following paragraphs describe an operation procedure to illustrate functions of these gesture signals.

Further refer to FIG. 3A to FIG. 3F. FIG. 3A to FIG. 3F are diagrams of an operation procedure of the image generation device 100 in the disclosure.

Figure 3A:
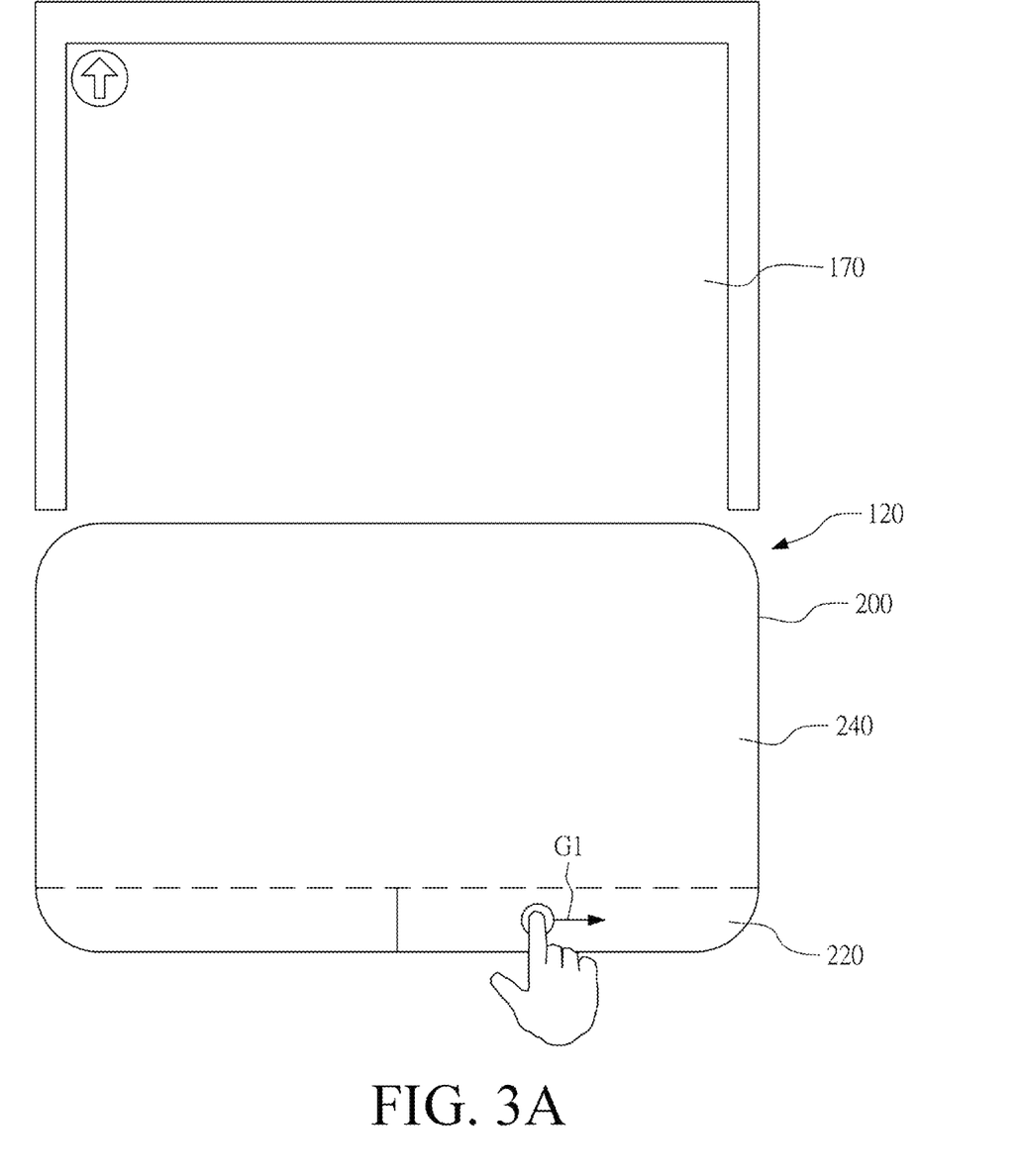
FIG. 3A to FIG. 3F are diagrams of an operation procedure of an image generation device in the disclosure.

First, as shown in FIG. 3A, the user inputs the first gesture signal G1 through the function area 220 of the touch module 120 to select a style of an image to be generated. The processing unit 160 selects, based on the first gesture signal G1, one of the plurality of style prompt words Tx1 and Tx2 stored in the memory 162. In an embodiment, it is preset that the first gesture signal G1 being a horizontal slide trajectory indicates that a style prompt word Tx1 signal is selected, and the first gesture signal G1 being a vertical slide trajectory indicates that a style prompt word Tx2 signal is selected. Alternatively, it is preset that the first gesture signal G1 being a single click signal indicates that the style prompt word Tx1 is selected, and the first gesture signal G1 being a double click signal indicates that the style prompt word Tx2 is selected.

Figure 3B:
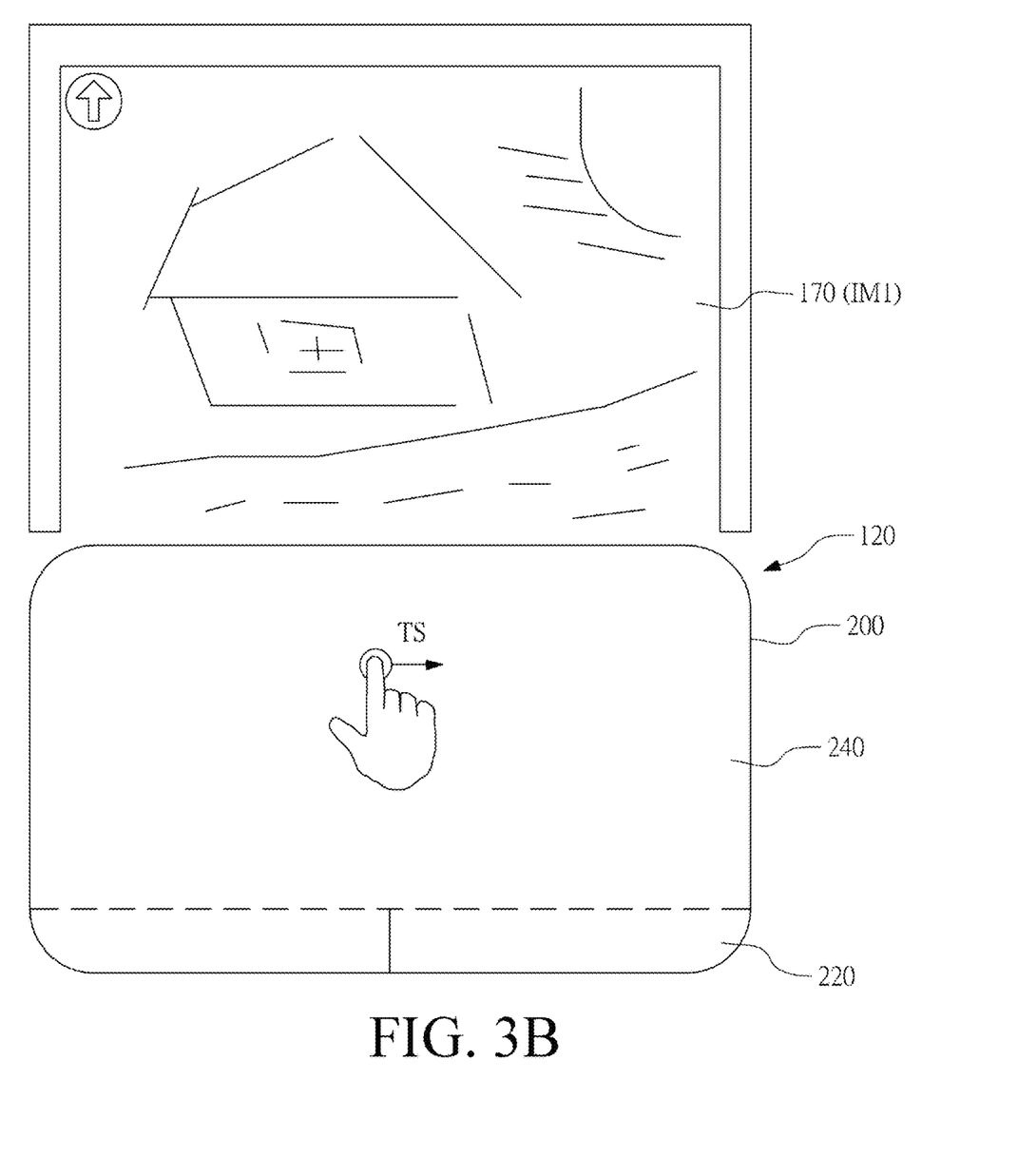

Then, as shown in FIG. 3B, the user inputs the at least one trajectory signal TS through the touch area 240 of the touch module 120 to generate the input image IM1. Specifically, the user continuously inputs trajectory signals TSs on the touch area 240 to draw the input image IM1.

Figure 3C:
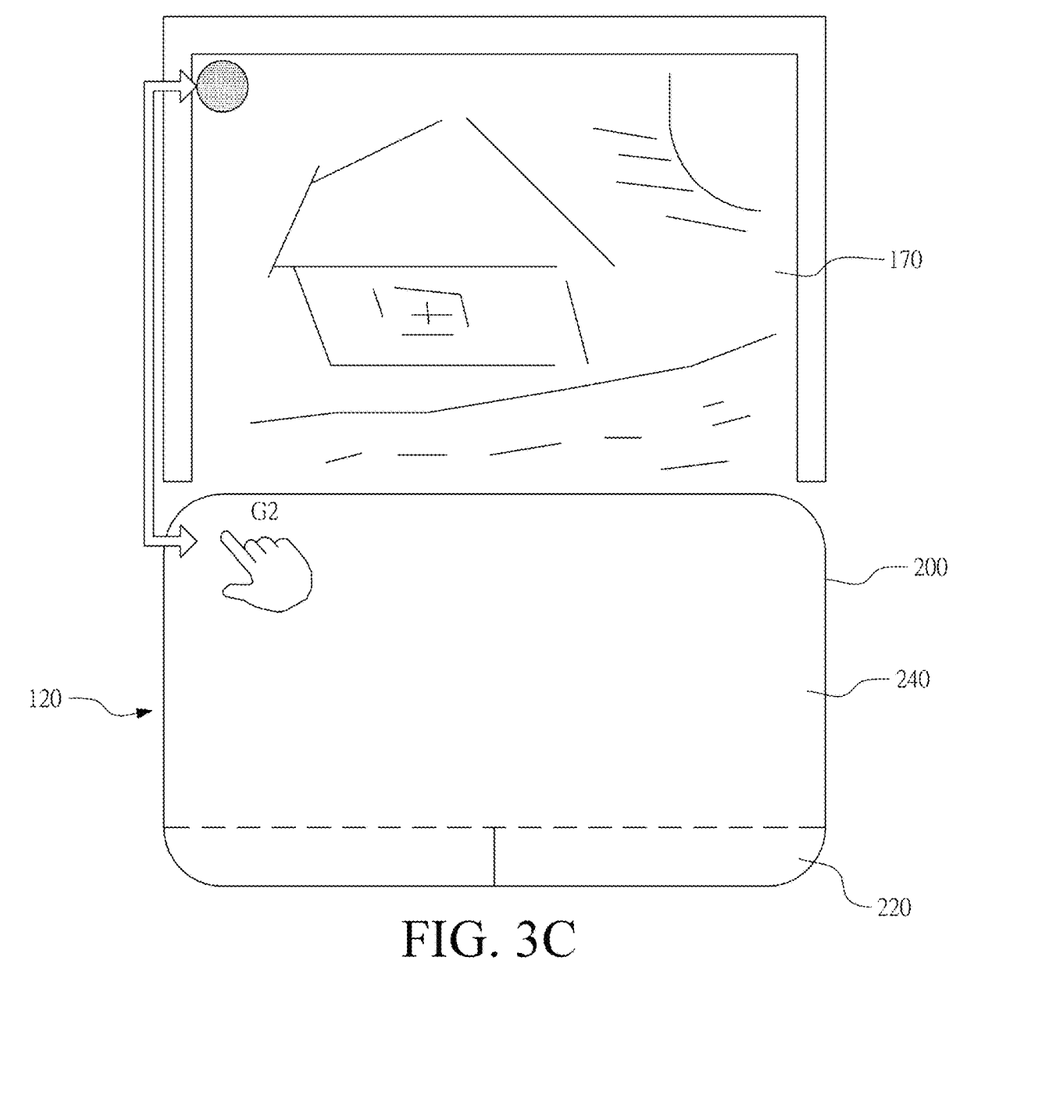

After completing the drawing of the input image IM1, as shown in FIG. 3C, in an embodiment, the user inputs the second gesture signal G2 through the touch surface 200 to start an image generation procedure. In an embodiment, the user inputs the second gesture signal G2 through the function area 220. Alternatively, as shown in the figure, the user inputs the second gesture signal G2 at a particular location of the touch area 240 (such as an upper left corner of the touch surface 200 shown in the figure).

Figure 3D:
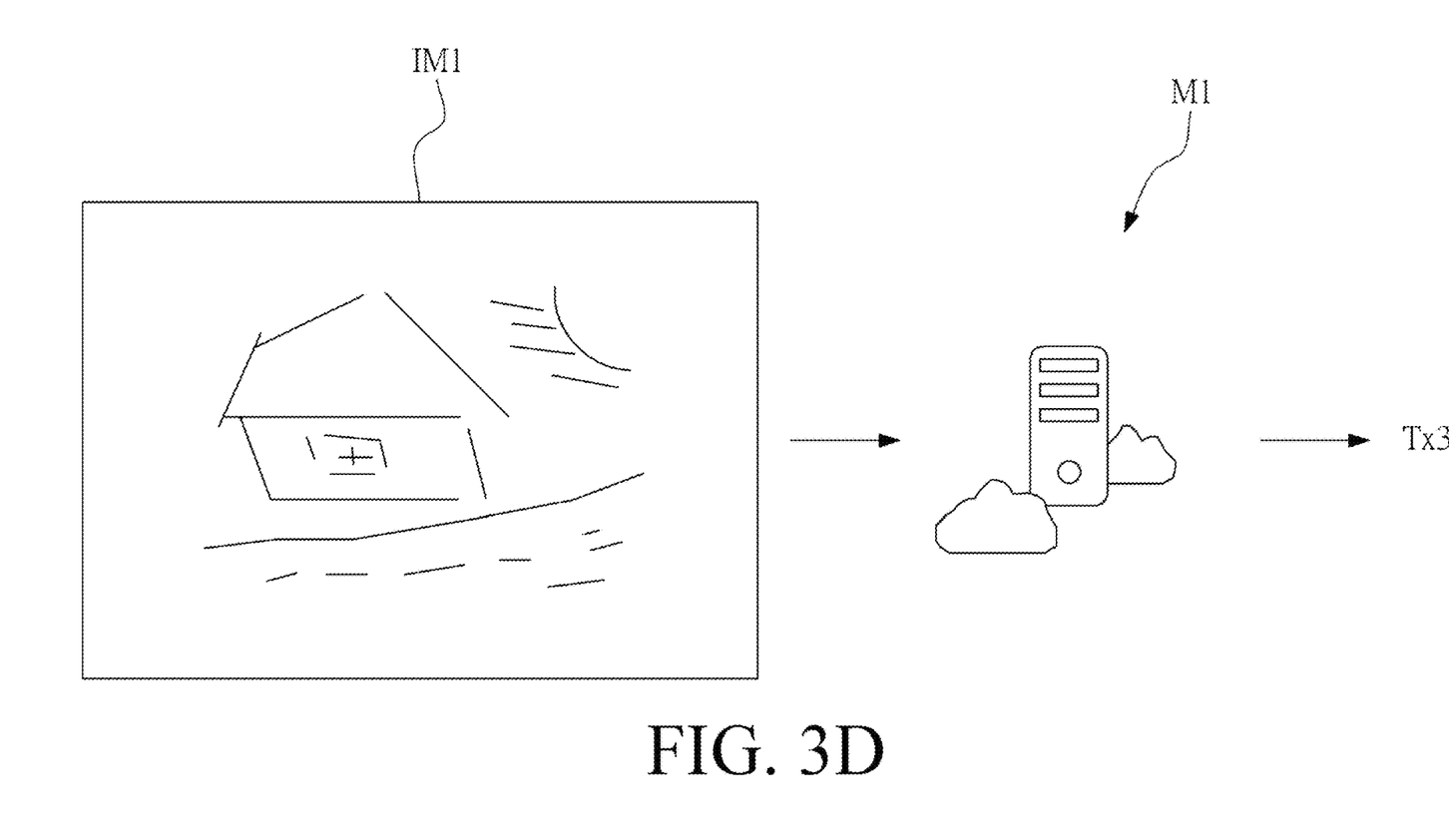

After the processing unit 160 detects the second gesture signal G2, as shown in FIG. 3D, the processing unit 160 uses the input image IM1 as an input for the generative artificial intelligence model M1 to generate an image prompt word set Tx3. This operation is understood as an image-to-text generation processing procedure for the generative artificial intelligence model M1.

Figure 3E:
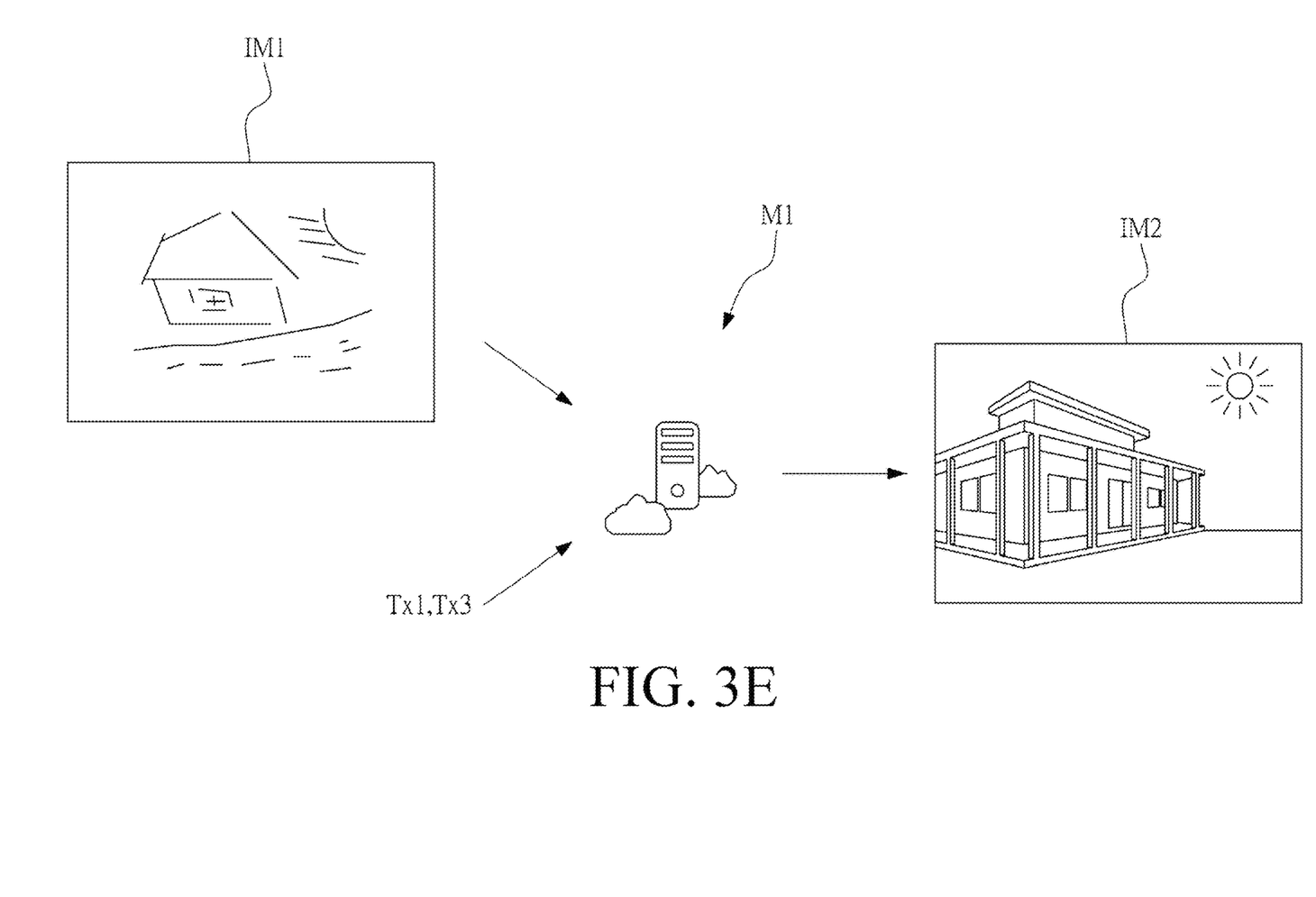

Then, as shown in FIG. 3E, the processing unit 160 further uses the style prompt word (such as the style prompt word Tx1) selected based on the first gesture signal G1, the image prompt word set Tx3 output by the generative artificial intelligence model M1 based on the input image IM1, and the input image IM1 generated based on the trajectory signal TS as inputs for the generative artificial intelligence model M1 to generate the output image IM2. This operation is understood as an image-to-image generation processing procedure for a prompt word for the generative artificial intelligence model M1.

It should be noted that, the technology in the disclosure focuses on an application manner of the generative artificial intelligence model M1 rather than the generative artificial intelligence model M1 itself. Any generative artificial intelligence model M1 with an image-to-text generation function and an image-to-image generation function, such as GPT-3 or GPT-4 developed by OpenAI, is applicable to the disclosure.

Figure 3F:
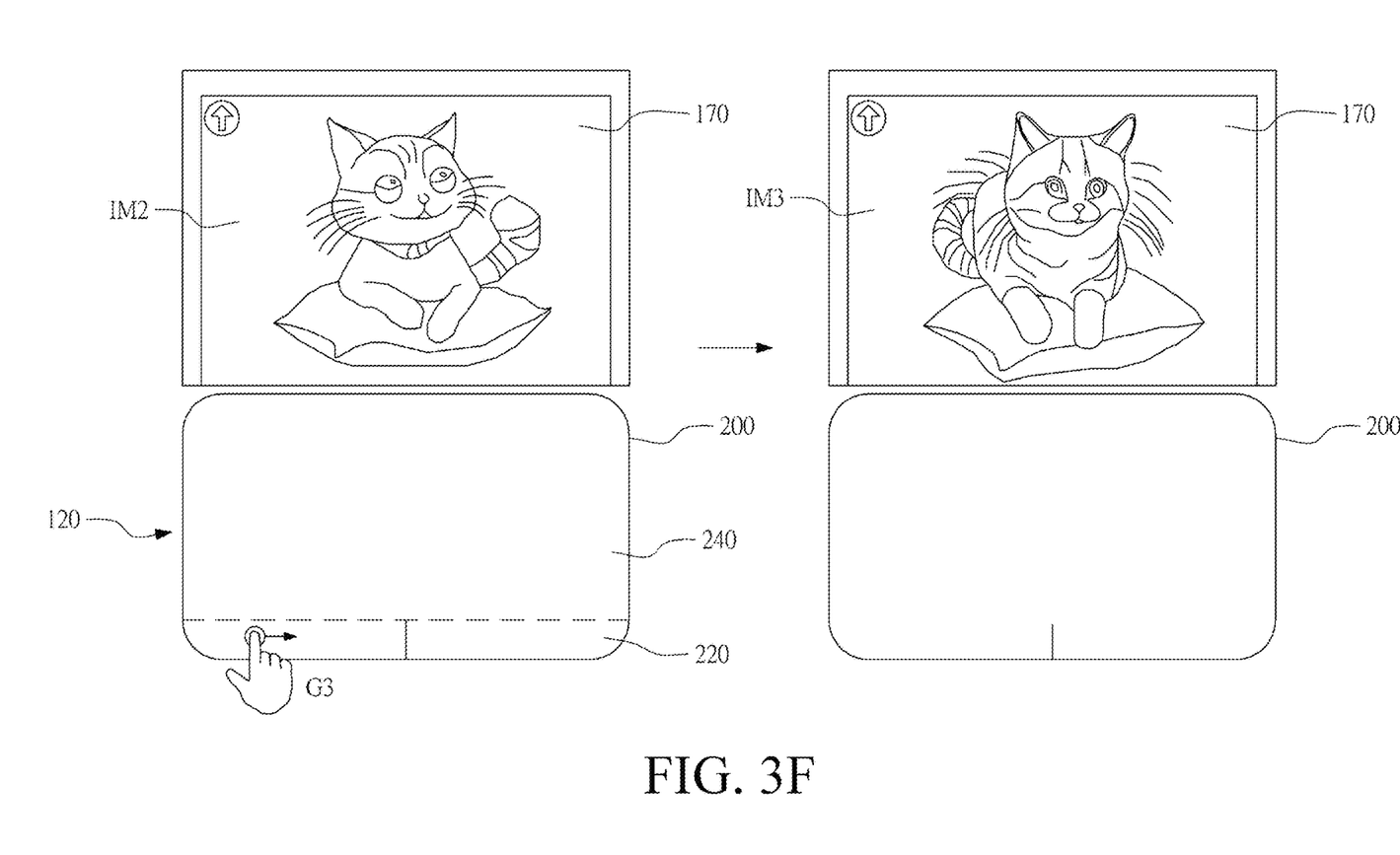

Further refer to FIG. 3F. After the output image IM2 is generated, when the user is not satisfied with the generated output image IM2 or more diverse output images IM2s need to be generated, in an embodiment, the user inputs a third gesture signal G3 through the function area 220 of the touch module 120 to start another image generation procedure. After detecting the third gesture signal G3, the processing unit 160 uses the output image IM2 as an input for the generative artificial intelligence model M1 to generate a transformed output image IM3. In an embodiment, the third gesture signal G3 is the same as the second gesture signal G2.

In another embodiment, the user also inputs, when the transformed output image IM3 is generated, another first gesture signal G1 through the function area 220 to additionally select another style prompt word (such as the style prompt word Tx2). After detecting the third gesture signal G3, the processing unit 160 uses the output image IM2 and the additionally selected style prompt word Tx2 as inputs for the generative artificial intelligence model M1 to generate the transformed output image IM3.

In addition, in an embodiment, the user also inputs a fourth gesture signal G4 through the function area 220 to adjust a corresponding width of a trajectory signal TS in the touch area 240. After detecting the fourth gesture signal G4, the processing unit 160 immediately changes a corresponding width of a subsequently input trajectory signal TS in the touch area 240.

The first gesture signal G1, the second gesture signal G2, the third gesture signal G3, and the fourth gesture signal G4 are preset and stored in the processing unit 160. These gesture signals are alternatively set by the user.

In an embodiment, the fourth gesture signal G4 is different from the first gesture signal G1, the second gesture signal G2, or the third gesture signal G3, and the second gesture signal G2 is different from the first gesture signal G1, to avoid erroneous determining by the processing unit 160.

The third gesture signal G3 is the same as the second gesture signal G2 or is different from the second gesture signal G2. Specifically, the processing unit 160 confirms, based on whether the output image IM2 is generated, that an operation corresponding to the second gesture signal G2 or an operation corresponding to the third gesture signal G3 needs to be performed. In other words, when confirming that the output image IM2 is generated, the processing unit 160 interprets a gesture signal as the third gesture signal G3 and uses the output image IM2 to further generate the transformed output image IM3. On the contrary, when confirming that the output image IM2 is not generated, the processing unit 160 interprets a gesture signal as the second gesture signal G2 to store the input image IM1, and uses the input image IM1 and the selected style prompt word Tx1 in combination with the generative artificial intelligence model M1 to generate the output image IM2. In an embodiment, the output image IM2 is used as a background image or an icon for the screen 170.

In addition, after the output image IM2 is generated, in an embodiment, the user also inputs a fifth gesture signal G5 through the function area 220 to adjust a size or shape of the output image IM2. After detecting the fifth gesture signal G5, the processing unit 160 sets the corresponding size or shape of the output image IM2 to suit the need of the user. In an embodiment, the fifth gesture signal G5 is used to set a length-width ratio of the output image IM2, or to change the shape of the output image IM2 into square or circle.

Figure 4:
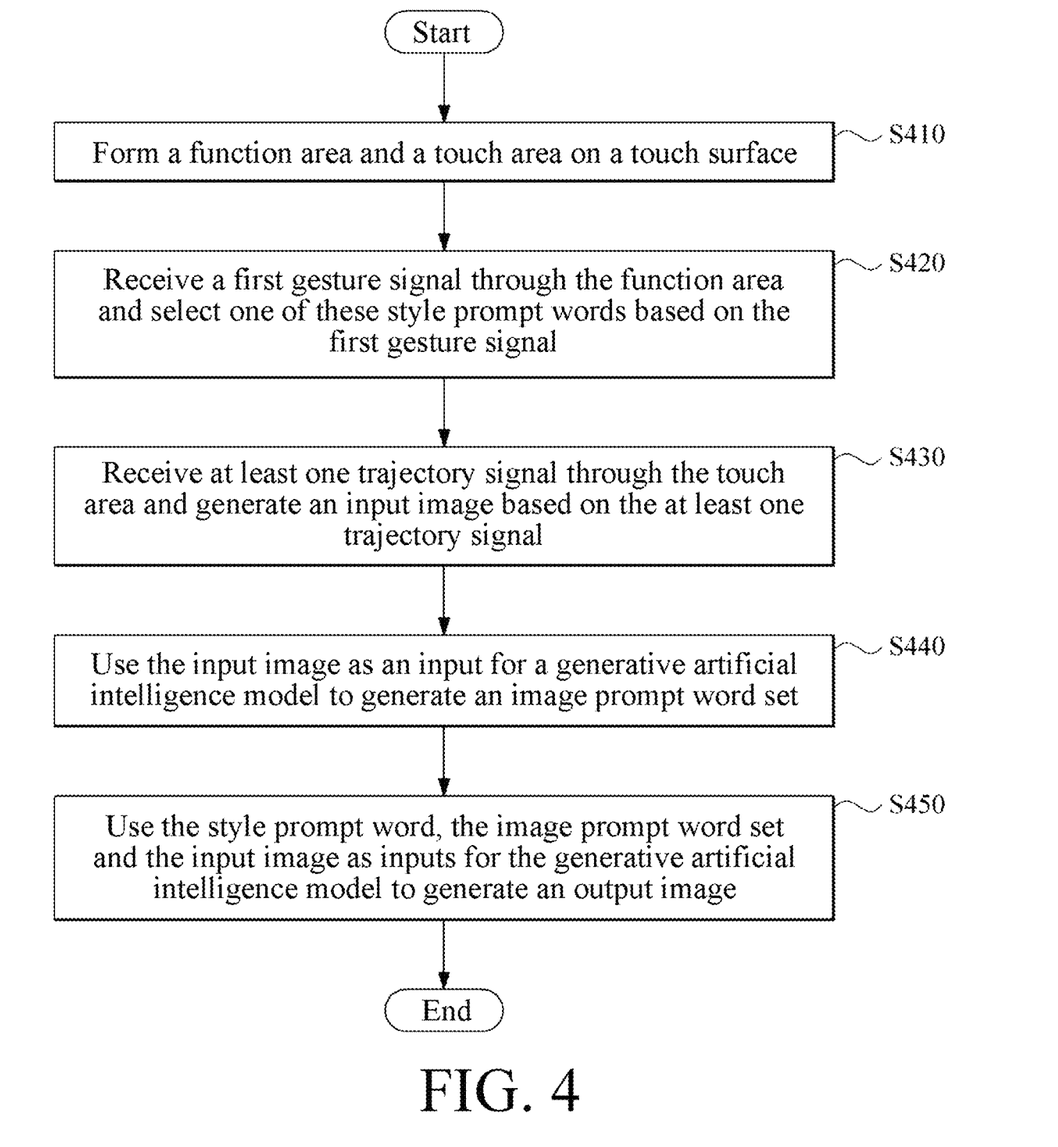
FIG. 4 is a flowchart of an image generation method according to an embodiment of the disclosure.

FIG. 4 is a flowchart of an image generation method according to an embodiment of the disclosure. This image generation method is performed by the image generation device 100 provided in FIG. 1. The image generation device 100 is configured to operate in combination with a generative artificial intelligence model M1, includes a touch module 120, and stores a plurality of style prompt words Tx1 and Tx2. The touch module 120 includes a touch surface 200. The image generation method includes the following steps.

First, as described in step S410, a function area 220 and a touch area 240 are formed on the touch surface 200. In an embodiment, in the step, the function area 220 and the touch area 240 are defined on the touch surface 200 by software or firmware. In an embodiment, the function area 220 is located at an edge of the touch surface 200, and an area outside the function area 220 is the touch area 240.

Then, as described in step S420, a first gesture signal G1 is received through the function area 220, and one of the style prompt words Tx1 and Tx2 is selected based on the first gesture signal G1.

Then, as described in step S430, at least one trajectory signal TS is received through the touch area 240, and an input image IM1 is generated based on the at least one trajectory signal TS.

In this embodiment, step S430 of receiving the at least one trajectory signal TS is performed after step S420 of receiving the first gesture signal G1 is performed. In other embodiments, alternatively, the at least one trajectory signal TS is received first to generate the input image IM1, and then the first gesture signal G1 is received to select a style prompt word (such as the style prompt word Tx1). Further, because the first gesture signal G1 and the trajectory signal TS are respectively received by the function area 220 and the touch area 240, in other embodiments, the first gesture signal G1 is also received to select the style prompt word Tx1 during a process of drawing the input image IM1 (in other words, during a process of receiving the at least one trajectory signal TS).

Then, as described in step S440, after the drawing of the input image IM1 is completed, the input image IM1 is used as an input for the generative artificial intelligence model M1 to generate an image prompt word set Tx3. This step is understood as an image-to-text generation processing procedure for the generative artificial intelligence model M1.

Next, as described in step S450, the style prompt word Tx1, the image prompt word set Tx3, and the input image IM1 are used as inputs for the generative artificial intelligence model M1 to generate an output image IM2. This step is understood as an image-to-image generation processing procedure for a prompt word (or referred to as a prompt (prompt)) for the generative artificial intelligence model M1. The style prompt word Tx1 and the image prompt word set Tx3 are input prompt words.

Figure 5:
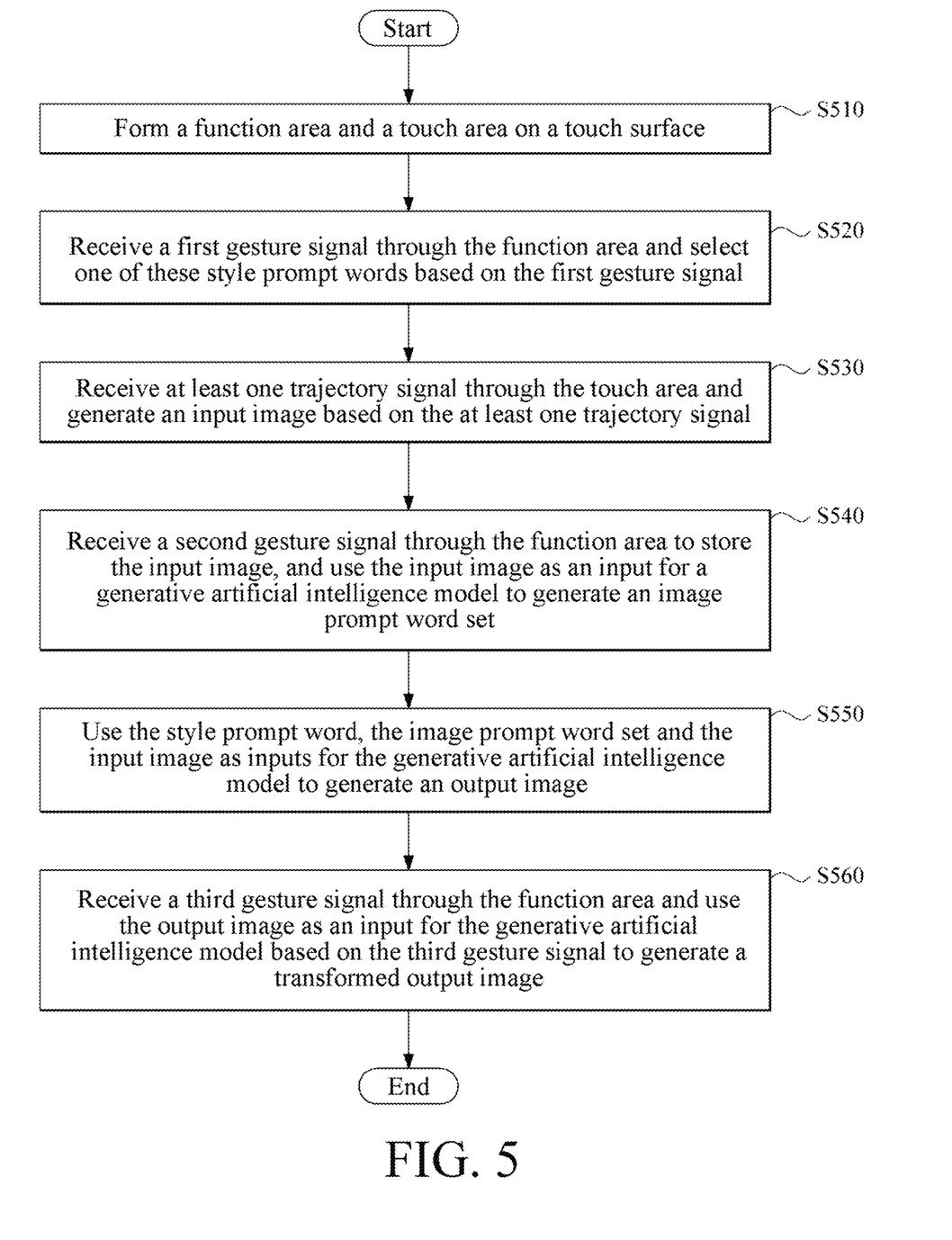
FIG. 5 is a flowchart of another image generation method according to an embodiment of the disclosure.

FIG. 5 is a flowchart of another image generation method according to an embodiment of the disclosure. This image generation method is performed by the image generation device 100 provided in FIG. 1. The image generation device 100 is configured to operate in combination with a generative artificial intelligence model M1, includes a touch module 120, and stores a plurality of style prompt words Tx1 and Tx2. The touch module 120 includes a touch surface 200. The image generation method includes the following steps.

First, as described in step S510, a function area 220 and a touch area 240 are formed on the touch surface 200. Then, as described in step S520, a first gesture signal G1 is received through the function area 220, and one of the style prompt words Tx1 and Tx2 is selected based on the first gesture signal G1 (for example, the style prompt word Tx1 is selected). Then, as described in step S530, at least one trajectory signal TS is received through the touch area 240, and an input image IM1 is generated based on the at least one trajectory signal TS.

Then, as described in step S540, a second gesture signal G2 is received through the touch surface 200 to store the input image IM1, and the input image IM1 is used as an input for the generative artificial intelligence model M1 to generate an image prompt word set Tx3. In an embodiment, the second gesture signal G2 is received through the function area 220 of the touch surface 200.

Next, as described in step S550, the style prompt word Tx1, the image prompt word set Tx3, and the input image IM1 are used as inputs for the generative artificial intelligence model M1 to generate an output image IM2. The second gesture signal G2 is understood as a trigger signal notifying a processing unit 160 to perform operations of steps S540 and S550 to generate the output image IM2.

Then, as described in step S560, a third gesture signal G3 is received through the function area 220, and the output image IM2 is used as an input for the generative artificial intelligence model M1 based on the third gesture signal G3 to generate a transformed output image IM3. Based on actual needs, a user repeats step S560 continuously to generate various transformed output images IM3s.

Based on the image generation device 100 and the image generation method of the disclosure, the user only needs to input the first gesture signal G1 and the at least one trajectory signal TS in a touch manner to complete an image generation operation step. This helps simplify an operation procedure, and integrates the entire operation procedure into the touch module 120, to improve operation efficiency of the user.

The foregoing is merely preferred embodiments of the disclosure, and does not constitute any limitation on the disclosure. Without departing from the scope of the technical means of the disclosure, various changes made by any person skilled in the art such as equivalent replacement or modification of the technical means and technical content disclosed in the disclosure are content of the technical means in the disclosure and shall fall within the protection scope of the disclosure.

What is claimed is:

1. An image generation device, configured to operate in combination with a generative artificial intelligence model, wherein the image generation device comprises:
    a touch module, comprising a touch surface, wherein the touch surface comprises a function area and a touch area;
    a control unit, wherein the control unit is electrically coupled to the touch module and is configured to:
    receive a first gesture signal through the function area; and
    receive at least one trajectory signal through the touch area; and
    a processing unit, wherein the processing unit is electrically coupled to the control unit and stores a plurality of style prompt words, and the processing unit is configured to:
    select one of the style prompt words based on the first gesture signal;
    generate an input image based on the at least one trajectory signal;
    use the input image as an input for the generative artificial intelligence model to generate an image prompt word set; and
    use the selected style prompt word, the image prompt word set and the input image as inputs for the generative artificial intelligence model to generate an output image.

2. The image generation device according to claim 1, wherein the touch module is a touch pad.

3. The image generation device according to claim 1, wherein the touch module is a touch screen.

4. The image generation device according to claim 1, wherein the control unit is configured to receive a second gesture signal through the touch surface, and the processing unit stores the input image based on the second gesture signal.

5. The image generation device according to claim 1, wherein the image generation device comprises a screen, and the processing unit is electrically coupled to the screen and is configured to present the input image and the output image on the screen.

6. The image generation device according to claim 1, wherein the function area is located at an edge of the touch surface.

7. The image generation device according to claim 1, wherein the control unit is configured to receive a third gesture signal through the function area, and the processing unit uses the output image as an input for the generative artificial intelligence model based on the third gesture signal to generate a transformed output image.

8. The image generation device according to claim 1, wherein the control unit is configured to receive a fourth gesture signal through the function area, and the processing unit sets a corresponding width of the trajectory signal received through the touch area based on the fourth gesture signal.

9. An image generation method, applicable to an image generation device, wherein the image generation device comprises a touch module and stores a plurality of style prompt words, the image generation device is configured to operate in combination with a generative artificial intelligence model, the touch module comprises a touch surface, and the image generation method comprises
    forming a function area and a touch area on the touch surface;
    receiving a first gesture signal through the function area and selecting one of the style prompt words based on the first gesture signal;
    receiving at least one trajectory signal through the touch area and generating an input image based on the at least one trajectory signal;
    using the input image as an input for the generative artificial intelligence model to generate an image prompt word set; and
    using the selected style prompt word, the image prompt word set and the input image as inputs for the generative artificial intelligence model to generate an output image.

10. The image generation method according to claim 9, wherein the method further comprises: receiving a second gesture signal through the touch surface and storing the input image based on the second gesture signal.

11. The image generation method according to claim 9, wherein the method further comprises: receiving a third gesture signal through the function area, and using the output image as an input for the generative artificial intelligence model based on the third gesture signal to generate a transformed output image.

* * * * *